(12) United States Patent
Ronchi et al.

(10) Patent No.: US 8,713,705 B2
(45) Date of Patent: Apr. 29, 2014

(54) APPLICATION AUTHENTICATION SYSTEM AND METHOD

(75) Inventors: Corrado Ronchi, Rome (IT); Shukhrat Zakhidov, Tashkent (UZ)

(73) Assignee: EISST Ltd., London (GB)

( * ) Notice: Subject to any disclaimer, the term of this patent is extended or adjusted under 35 U.S.C. 154(b) by 665 days.

(21) Appl. No.: 12/713,475

(22) Filed: Feb. 26, 2010

(65) Prior Publication Data

US 2011/0030040 A1 Feb. 3, 2011

Related U.S. Application Data

(60) Provisional application No. 61/230,825, filed on Aug. 3, 2009.

(51) Int. Cl.
G06F 7/04 (2006.01)
G06F 21/30 (2013.01)
G06F 21/44 (2013.01)

(52) U.S. Cl.
CPC ............... *G06F 21/30* (2013.01); *G06F 21/44* (2013.01)
USPC .......................................................... 726/29

(58) Field of Classification Search
CPC ................................. G06F 21/30; G06F 21/44
USPC .................................. 726/2–5, 7, 21, 26–29
See application file for complete search history.

(56) References Cited

U.S. PATENT DOCUMENTS

| | | | |
|---|---|---|---|
| 7,512,802 B2 | 3/2009 | Minemura | |
| 7,526,811 B1 | 4/2009 | Taylor | |
| 7,539,868 B2 | 5/2009 | Balard et al. | |
| 7,552,342 B1 | 6/2009 | Rennie | |
| 2002/0147645 A1* | 10/2002 | Alao et al. | 705/14 |
| 2002/0162009 A1 | 10/2002 | Shmueli et al. | |

(Continued)

FOREIGN PATENT DOCUMENTS

| | | |
|---|---|---|
| EP | 1 653 321 A1 | 5/2006 |
| EP | 1 669 903 A2 | 6/2006 |
| EP | 1 684 182 A1 | 7/2006 |
| WO | WO 2009/137946 | 11/2009 |

OTHER PUBLICATIONS

International Search Report and Written Opinion mailed Oct. 14, 2010 in corresponding International Application No. PCT/EP2010/061326.

(Continued)

*Primary Examiner* — Peter Shaw

(57) ABSTRACT

A system and method are provided for validating executable program code operating on at least one computing device. Program instructions that include a request for access to sensitive information are executed on a first computing device. An authentication request for access to the electronic information is sent from the first computing device to a second computing device. In response to the authorization request, a challenge is sent from the second computing device to the first computing device. The first computing device executes the challenge and generates an authentication response that includes at least one memory object associated with the program instructions. The response is sent to the second computing device from the first computing device, and the second computing device generates and sends a verification to the first computing device confirming that at least some of the first program instructions have not been altered or tampered with, and further grants the first computing device access to at least some of the electronic information.

24 Claims, 7 Drawing Sheets

(56) References Cited

U.S. PATENT DOCUMENTS

| | | |
|---|---|---|
| 2004/0049678 A1* | 3/2004 | Walsmley et al. ............ 713/168 |
| 2005/0188214 A1* | 8/2005 | Worley et al. ................ 713/187 |
| 2006/0048223 A1 | 3/2006 | Lee et al. |
| 2006/0136745 A1* | 6/2006 | Taylor ........................ 713/187 |
| 2006/0195906 A1 | 8/2006 | Jin et al. |
| 2007/0107056 A1 | 5/2007 | Frank et al. |
| 2007/0198834 A1 | 8/2007 | Ksontini et al. |
| 2007/0233880 A1 | 10/2007 | Nieh et al. |
| 2007/0300064 A1* | 12/2007 | Isaacs et al. ................ 713/168 |
| 2008/0034210 A1 | 2/2008 | Jallad et al. |
| 2008/0072066 A1 | 3/2008 | Vogler et al. |
| 2008/0172341 A1 | 7/2008 | Crandell |
| 2008/0240068 A1* | 10/2008 | Ishimoto ..................... 370/345 |
| 2009/0126017 A1 | 5/2009 | Chahal |
| 2009/0144332 A1 | 6/2009 | Montgomery |
| 2009/0328225 A1* | 12/2009 | Chambers et al. ............ 726/26 |

OTHER PUBLICATIONS

Mark Shaneck, et al., "Remote Software-Based Attestation for Wireless Sensors," Security and Privacy in Ad-Hoc and Sensor Networks Lecture Notes in Computer Science; LNCS, Springer, Berlin, pp. 27-41 (Jan. 1, 2005).

Rick Kennell, et al., "Establishing the Genuinity of Remote Computer Systems," 12$^{th}$ USENIX Security Symposium, pp. 295-310 (Jan. 1, 2003).

David Kushner, "Big Brother at Work," IEEE Spectrum, pp. 57-58 (Dec. 2004).

Ian Jonson, "Stealthsurfer," URL:http://stealthsurfer.com/press_content/TheGlobeandMail1-13-04.pdf p. 1, line 1-p. 3, line 3 (Jan. 13, 2004).

Wireless Security, Identity Management Endpoints Threats Data Protection Encryption CCTV, Issue 14 (Nov. 2007).

International Preliminary Report on Patentability (Chapter I of the Patent Cooperation Treaty) dated Feb. 7, 2012 in corresponding International Application No. PCT/EP2010/061326).

* cited by examiner

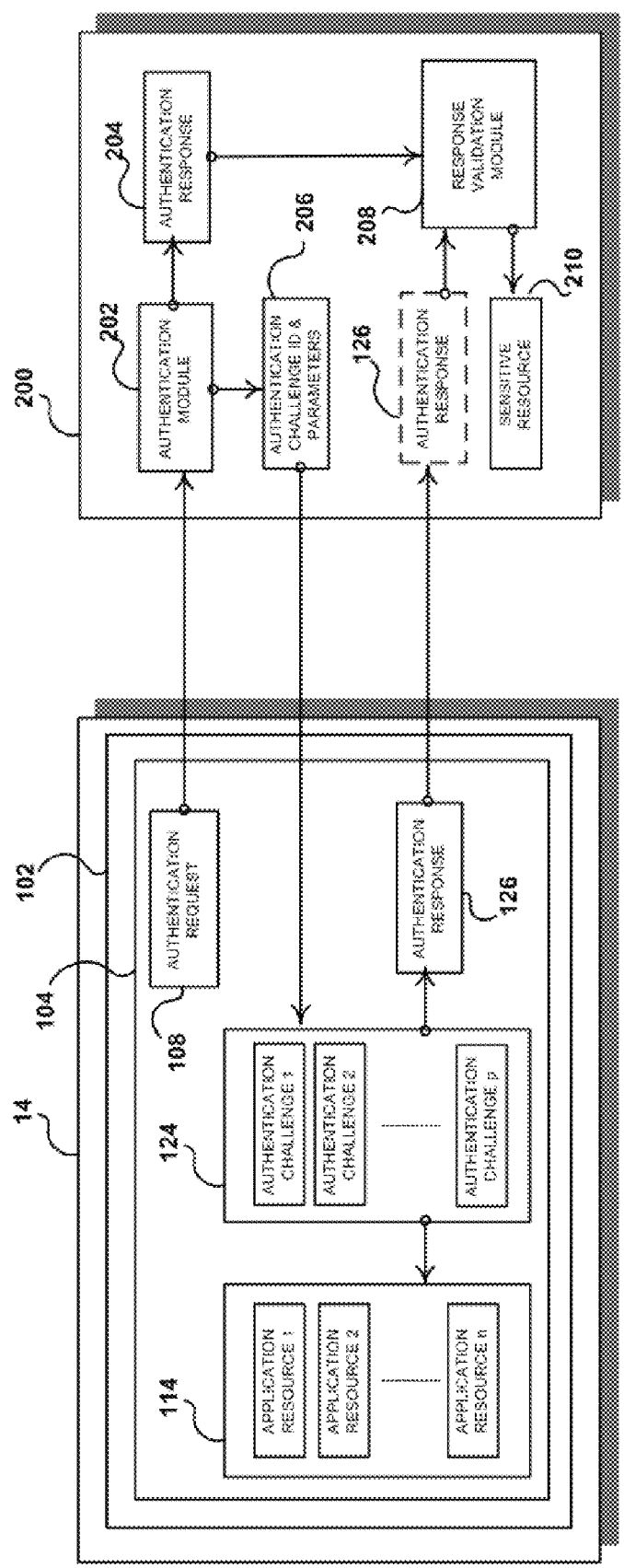

APPLICATION AUTHENTICATION SYSTEM AND METHOD

CROSS-REFERENCE TO RELATED APPLICATION

This application is based on and claims priority to U.S. Provisional Patent Application Ser. No. 61/230,825 filed on Aug. 3, 2009, and entitled APPLICATION AUTHENTICATION METHOD AND SYSTEM, the entire contents of which are hereby incorporated by reference.

BACKGROUND

1. Field

The teachings herein relate, generally, to software-related security and, more particularly, to authenticating software by determining whether software operating on a computing device has been tampered with or altered.

2. Description of the Related Art

Most known Internet web services require end users to authenticate themselves to a particular computing device, referred to herein, generally, as a "control server." The control server grants users access to information, data or services that may be financial or otherwise confidential in nature. Many e-banking or e-payment services protection is based on an assumption that users are effectively and securely authenticated before the information, data or services are provided to them, and that the financial transaction overall is, therefore, secure.

A "host" device, as referred to herein, includes a computing device that stores information, data or services to which the control server authorizes access. In other contexts, a host device may include a computing device operated by an end-user.

One known and relatively simple form of authentication involves the use of static, i.e., fixed in time, login credentials which the user provides to the control server each time the user requests access. For example, the user submits a username and password and, once validated, the control server grants access. The next time the user requests access, the user submits the same username and password. In such scenario, the security of Internet web transactions relies on the secrecy of the login credentials, which are the only factors guarding against illegitimate use by unauthorized individuals. Unfortunately, the use of static login credentials may be ineffective against, for example, pharming, phishing, sniffing, simple social engineering or brute force attacks, whereby an attacker is capable of guessing or otherwise obtaining login credentials, and may carry out a number of fraudulent transactions before the legitimate user or the Internet web service provider discovers the fraud. Such attacks highlight a weakness of static login credentials, including the decoupling of authentication credentials from the individual, whom they are purposing to authenticate.

The use of static login credentials to access online services that otherwise require strong security assurances is not sufficiently reliable and has, therefore, been mostly discontinued. In place of static login credentials, the use of one-time-passwords has been used, in which each of a plurality of passwords are used to gain access to secured information, data or services, and which are based on one of three methods. One method regards time-synchronization between an authentication server and a software application or device operated by a user to generate the one-time-passwords. A second method regards use of a list of one-time-passwords that are printed on paper and securely kept by the user. A third method regards the use of a portable electronic device, such as a mobile phone, that is operated by a user and provides a second channel besides the Internet for receiving the one-time-passwords generated on the server.

When using an external hardware device, the above-identified first method falls into a general class of two-factor authentication methods, which aims at binding the physical user to the requirements of the authorization procedure. The two-factor authentication method, in addition to the static login credentials, includes use of something that the user possesses, such as a physical device or a token external to a host device. Alternatively, the two-factor authentication may include use of a physical characteristic or trait of the user, and may be obtained using biometric sensors such as via fingerprinting or iris scanning. Due to technological limitations and high costs associated with mass deployments of biometric devices, however, the prevailing choice has until now been to provide users with small hardware tokens or smart devices that the user must have and operate each time the user requests access to secured information, data or services provided on the Internet.

The two-factor authentication may include a tamper-resistant device that stores a user-specific secret, which is required to authenticate a user. For example, a smart card and reader are connected to a host device and used during an authentication procedure. The control server authorizes access to information, data and/or services when the server receives authorization information that is obtained from a user-specific secret stored on the smart card.

Both methods described above rely on a software application (e.g., a software-controlled process executed on a host device) to communicate with the control sever. For example, a banking application executing on a host device may require that a transaction service be performed, in which the control sever may generate a random session key and then protect the session key in such a way that it can be obtained only with the user-specific secret key stored on the smart card. It would appear that only the banking application can access the secret key and that the secret key can never leave the tamper-resistant smart card. It would further appear that the secret can be safely kept and operated by the user and that no one except the legitimate user would be able to complete a transaction securely.

The one-time-passwords method and other two-factor authentication methods described above, however, suffer from the same fundamental weakness. A rogue application, such as developed by a malicious programmer, may be executed on an end user's device or on another device via a remote connection to the end user's device, and can make an identical request to the control server after obtaining all the necessary authentication data from the unaware user. The objective of the rogue application is, typically, only to access sensitive information, such as banking resources, and not to know or otherwise extract the user-specific secret key from the tamper-resistant device. To obtain its goal, the rogue application can simply make the same authentication request to the control server that the banking application would make using the user-specific secret, and thus be able to obtain access to the sensitive resources on the server. Continuing with this example, from the control server point of view, there is nothing to differentiate the bank application's authentication request from that of the rogue application. Once this latter has gained access to the service, it can, at least in principle, operate independently from the bank application and from any further user input.

Remarkably, the above-described weakness applies to virtually all user-based authentication methods, regardless of the respective enabling technology applied to generate and store the secret access credentials. This is largely due to a need for all user-based authentication methods to rely on the trustworthiness of the applications employed to communicate with one or more service providers.

The security of Internet web transactions is, accordingly, dependent on an ability to authenticate executable code that runs on a host device, an issue that falls into the more general category of software security. Providing secure software, for example, in a distributed computing environment presents major problems for software development vendors. Experienced hackers may be able to intercept the distribution or the installation of otherwise secure software and alter its performance in some way. Alterations may include, for example, bypassing automatic licensing checks, inserting malicious computer viruses, and interacting with external computing resources, such as groups of software robots that run autonomously and automatically to achieve various criminal goals (e.g., "botnets").

Unfortunately, proficient hackers are capable of bypassing even very sophisticated protection techniques. One technique hackers use is to statically analyze and trace the executable code to critical points in the execution sequence and then alter return values to those that are required to gain the vendor's authorization or to modify the application's business logic. By changing the executable code to effectively bypass critical checks, hackers are able to bypass any internal validation requests and to hijack an Internet web transaction after the authentication procedure has been properly completed by the unaware user. Moreover, once software has been modified, a hacker can create a permanent fix by patching the operating system or the executable code itself and then by reinstalling the software on the operating system and even distributing worldwide the hacked software.

Moreover, some sophisticated Trojan applications have the ability to dynamically alter the operation of program code by modifying an image of an application or application code which is resident in the memory of a computing device's operating system. In this way, one or more internal processes performed by executable code may be altered after the modified image is handed over to the operating system. By changing the image of executable code, hackers can bypass all static code defenses including reactive techniques, such as fingerprinting and signature-detection, which are heavily utilized by today's anti-virus programs.

Software vendors have reacted to threats from hackers by applying various techniques, such as source code obfuscation, to complicate the task of analyzing and reverse engineering the executable code. Such defenses, however, can at best slow down the hacking attempts that will eventually succeed given enough time and resources.

Attempts at counteracting software attacks, particularly such as those described above, have spawned the development of integrity-check methods. These methods compare a calculated checksum of a software application's image running in memory against a known checksum of the application. If the two checksum values are different, then the application is deemed to have been tampered with. Unfortunately, this is considered a weak form of tamper detection since an attacker can remove the check in the appropriate context within the software or application. Consequently, any comparison between the two checksums is only useful when the comparison is performed independently of the application's host environment. For example, the comparison should be made on a control sever or an external tamper-resistant device on which the valid checksum had been previously stored. Unfortunately, this method of integrity-checking requires the previous knowledge of the software's respective checksum values in one or more various operating conditions, which may be impossible, or extremely complex and costly to implement. Furthermore, given enough time and resources, it is still possible for a crafty programmer to write malicious software that sniffs and captures all possible checksums required by the integrity-check process and to provide a table or other data source to a rogue application for use during the integrity-check authentication process.

Hence, it is highly desirable to improve prior art methods for authorizing access to data that are securely stored on a control server or on a tamper-resistant device. More particularly, providing reliable and practicable authentication for software applications is of paramount importance in today's global access and service environment, which is presently being fueled by the pervasiveness of the Internet.

SUMMARY

A system and method are provided for validating executable program code operating on at least one computing device.

In an embodiment, first program instructions are executed on a first computing device, wherein the first program instructions include a request for access to electronic information that is stored on the first computing device or a second computing device. An authentication request for access to the electronic information is transmitted to the second computing device from the first computing device. An authentication challenge is received by the first computing device from the second computing device, wherein the authentication challenge is in response to the authentication request. The challenge is executed by the first computing device and an authentication response is generated in response to the authentication challenge, wherein the authentication response represents at least one memory object associated with the first program instructions. Further, the authentication response is transmitted to the second computing device from the first computing device, and a verification is received from the second computing device, wherein the verification represents a confirmation that at least some of the first program instructions have not been altered, and wherein the verification further grants the first computing device access to at least some of the electronic information.

In another embodiment an authentication request is received from a first computing device, wherein the authentication request is generated by first program instructions executed on the first computing device, and wherein the first program instructions include a request for access to electronic information that is stored on the first computing device or a second computing device. In response to the authentication request, an authentication challenge is generated and transmitted to the first computing device. The authentication response is received from the first computing device in response to the first computing device executing the authentication challenge, and further wherein the authentication response represents at least one memory object associated with the first program instructions. A verification is generated that represents a confirmation that at least some of the first program instructions have not been altered, wherein the verification further grants the first computing device access to at least some of the electronic information. Further the verification is transmitted to the first computing device.

In still another embodiment, first program instructions are executed on a first computing device, wherein the first program instructions include a request for access to electronic information that is stored on the first computing device or a second computing device. An authentication request for access to the electronic information is transmitted to an external device connected to the first computing device, and received by the external device. The external device randomly selects at least one of an identifier and parameter of the authentication request to provide an authentication challenge, which is sent by the external device to the first computing device. The first computing device receives the challenge and generates an authentication response in response to executing the authentication challenge, and further wherein the authentication response represents at least one memory object associated with the program instructions. The response is verified by the external device, and the computing device is granted access to electronic information as a function of the verification.

Other features and advantages of the present application will become apparent from the following description of the application that refers to the accompanying drawings.

BRIEF DESCRIPTION OF THE DRAWINGS

For the purpose of illustrating the application, there is shown in the drawings several forms which are presently preferred, it being understood, however, that the teachings herein are not limited to the precise arrangements and instrumentalities shown. The features and advantages of the present application will become apparent from the following description of the application that refers to the accompanying drawings, in which:

FIG. 5 is a block diagram that illustrates an alternative embodiment; and

DESCRIPTION OF EMBODIMENTS

Figure 1:
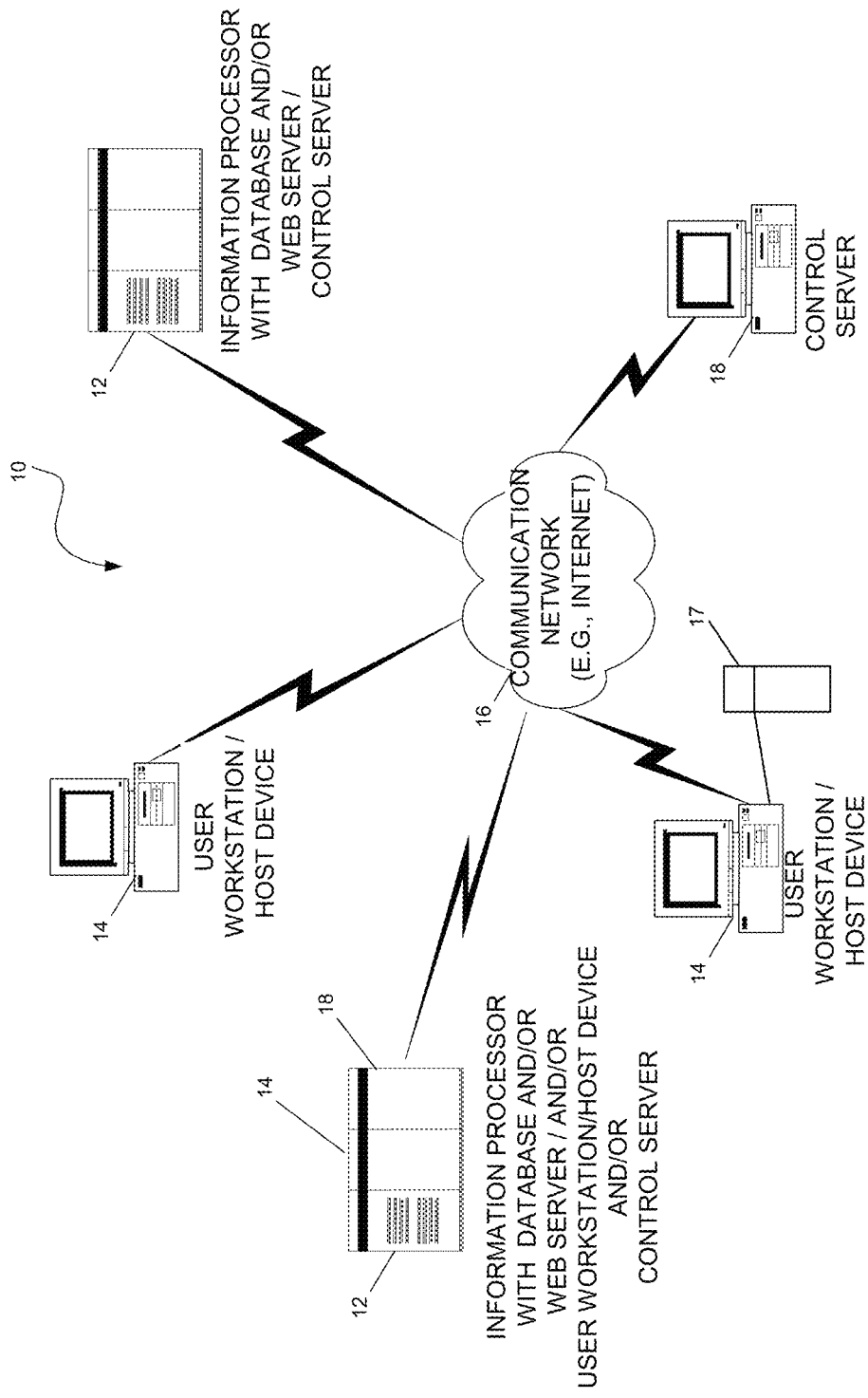
FIG. 1 illustrates an example hardware arrangement, in accordance with an embodiment.

In accordance with the present application, a system and method are provided for authenticating executable program code running on a host device. More particularly, the present application provides a system and method for a control server or other external device to authenticate a "client" software application (a software controlled process executed, for example, on the host device) that is attempting to access secured data and resources stored on the control server or the device. In an embodiment, the secured data and resources reside outside of the host device, and authorization providing access to the secured data and resources, for example, via the control server, also authenticates the client software application.

In accordance with an embodiment, a software application operating on a computing device requests access to information, data and/or services. The computing device receives a unique "challenge," as known in the art, from a control server. In particular, the challenge is transmitted to the computing device and is executed in a particular context, such as within the application's resources and objects that are preferably used for the software's execution. The execution of the authentication challenge on the computing device generates an authentication response that is sent to the control server for validation. A determination can be made as to whether the executable code has been altered, and access to the sensitive resources will be granted to the software application only if the result of the server validation procedure indicates no tampering.

Server authentication challenges can be generated on the control server in a practically unlimited number of ways without the need to perform any prior configuration or data storage on the computing device. The present application includes several embodiments that deliver and execute the authentication challenge within a server-client architecture. Alternative embodiments are envisioned, such as by replacing the server and/or the client components with different or additional components capable of executing similar tasks. For example, the server and client components may be exchanged (i.e. a secure client authenticates a server application), or the server, client or both are replaced by a mobile or tamper-proof secure device.

In an embodiment, executable code, such as a software application that runs on a computing device, is validated. During execution, the software application may attempt to access sensitive information, data and/or Internet web services or resources, such as relating to financial resources. For example, the validated application or executable code is resident in an operating system. In an embodiment, the software application transmits an authentication request to a control server, which generates an authentication challenge to the software application. The challenge may be provided in the form of executable program code, and transmitted to the computing device on which the software application runs. After the challenge is received by the computing device, the computing device executes the challenge and an authentication response is generated and transmitted to the control server. The challenge may be executed by the software application, in conjunction with the software application, or independently of the software application, and further via one or more devices, which may function to provide cross-referencing. Thereafter, the control sever executes steps to verify the validity of the authentication response to determine whether the application software has been altered or otherwise tampered with. In an example, once verified, the control server grants the software application access to the information, data and/or Internet web services or resources as a function of the outcome of the verification process.

In another embodiment, the control server may randomly generate a unique application authentication challenge each time an authentication request is received from a computing device. Moreover, the software application authentication request transmitted to the control server may contain an identifier that is generated by or in connection with the software application. In this embodiment, the application authentication challenge generated by the control server may include a respective software application identifier or a portion thereof that corresponds to the identifier.

In another embodiment, user authentication credentials may be requested by the control server following a successful validation of the application authentication response. In this embodiment, the user authentication credentials are required before the control server grants access to the sensitive information, data and/or Internet web services or resources.

Moreover and in another embodiment, the control server may utilize previously generated application authentication challenges to generate one or more new application authentication challenge(s) to extend a software application's ability or authorization to access to sensitive information, data and/or Internet web services or resources.

In still another embodiment, executable program code, such as resident in a client operating system and that is provided with executable program instructions, is verified and/or validated. In this example embodiment, the software application transmits an authentication request to an external device that is connected to a computing device. The external device may be, for example, a flash drive or other memory device that is provided with program instructions. Continuing with this embodiment, the external device generates or selects an identifier and/or one or more parameters representing the authentication challenge. The identifier and one or more parameters may be selected on one or more random bases. Once selected, the external device transmits the identifier and/or one or more parameters to the software application, which loads and executes the authentication challenge as a function of the provided identifier and/or parameters. By executing the challenge, an authentication response is generated, which is transmitted to the external device. The external device receives the authentication response, and verifies the validity of the authentication response by comparing the response with the authentication response selected internally by the external device using the identifier and/or one or more parameters to determine whether the application software has been altered or otherwise tampered with. If not, then the external device grants the software application access to the sensitive information, data and/or Internet web services or resources. Thus, the outcome of the verification process causes the external device to grant or preclude access by the software application to the sensitive information, data and/or Internet web services or resources.

In an embodiment, a plurality of challenges and a plurality of responses are stored on the external device. The device randomly selects a plurality of the challenges to provide a combined challenge. The device similarly selects a corresponding plurality of the responses to provide a combined response that corresponds to the combined challenge. The application response received by the device is compared with the combined response for verification.

In an embodiment, the identifier and parameters required to select an authentication challenge are updated on the external device by periodically connecting to a control server and receiving the updated identifier and/or parameters. Moreover and in an embodiment, the authentication challenge required to generate an authentication response is updated on the computing device by periodically connecting to a control server.

In another embodiment, executable program code that is resident in an operating system is verified. In this embodiment, a software application that includes the executable program code transmits an authentication request to a control server. In response, the control sever generates an authentication challenge that is provided in the form of executable program code, and the control server transmits the challenge to the software application. The software application loads and executes the challenge. The executing of the challenge causes the software application to generate an authentication response, which is transmitted to the control server. After the authentication response is received, the control sever verifies the validity of the authentication response. If the control server successfully verifies the validity of the authentication response, the control server transmits a verification to an external tamper-proof device that is connected to the computing device that on which the software application runs, or on which one or more of sensitive information, data, Internet web services or resources are stored and which the software application is trying to access. After the control server verifies the authentication response and the verification is transmitted to the external tamper-proof device, the external tamper-proof device grants the software application access to sensitive information, data and/or Internet web services or resources. Thus, based on the outcome of the verification process carried out by the control server, software applications are granted or denied access to sensitive information, data and/or Internet web services and/or resources.

The above described embodiments are effective to establish whether software has been tampered with, as well as to preclude unauthorized access to sensitive information, data and/or Internet web services or resources.

In embodiments, a strong and flexible authentication method is provided which does not impact the performance of the software application, excessively. Furthermore, server authentication challenges can be generated on a control server in a virtually unlimited number of ways without a need to perform any prior configuration or prior data storage, such as on the computing device. This overcomes at least one major drawback of prior art security measures, as the teachings herein preclude a malicious programmer or Trojan code from easily guessing or looking up from a table of previously sniffed replies authentication responses that may be required by during sever validation in response to each new request to access the sensitive resources on the control server.

Referring to the drawing figures, in which like reference numerals represent like elements, FIG. 1 illustrates an example hardware arrangement, in accordance with an embodiment and referred herein, generally, as system 10. In the example shown in FIG. 1, information processor(s) 12 are operable to function as internet web servers, as known to those skilled in the art, and may further host confidential and/or sensitive information, data, and/or Internet web services. Also shown in FIG. 1 are user workstation/host devices 14 that are operated by, for example, end-users desiring to operate computer software applications and/or access the information, data and/or Internet web services or resources housed on information processor(s) 12. User workstation 14 may further be operatively coupled to external device 17, which may be a flash drive or other memory device and that is provided with program instructions. Moreover, control server 18 is illustrated, which provides authentication challenges and receives authentication responses thereto for providing access to one or more of sensitive information, data and/or Internet web services/resources and/or provided thereto, for example, via information processor 12. In an alternative embodiment, and as illustrated in FIG. 1, information processor 12 may include or otherwise be configured and operable as control server 18. In this way, sensitive information, data and/or Internet web services or resources that may be hosted on information processor 12 may be protected by control server 18 that is similarly provided via information processor 12. Moreover, information processor 12 may further be configured and operable as user workstation/host device 14.

Information processor 12, user workstation/host devices 14 and/or control server 18 preferably include all databases necessary to support the systems and methods provided herein. However, it is contemplated that information processor 12 can access any required database via communication network 16 or any other communication network to which information processor 12 may be coupled. Communication network 16 is preferably a global public communication network such as the internet, but can also be a wide area network (WAN), local area network (LAN), or other network that enables two or more computers to communicate with each other.

In a preferred embodiment, information processor 12 and user workstation/host 14 are any devices that are capable of sending and receiving data across communication network 16, e.g., mainframe computers, mini computers, personal computers, laptop computers, a personal digital assistants (PDA), cellular telephones and Internet access devices such as Web TV. Information processors 12, user workstation/hosts 14 and/or control servers 18 are coupled to communication network 16 using any known data communication networking technology.

Figure 2:
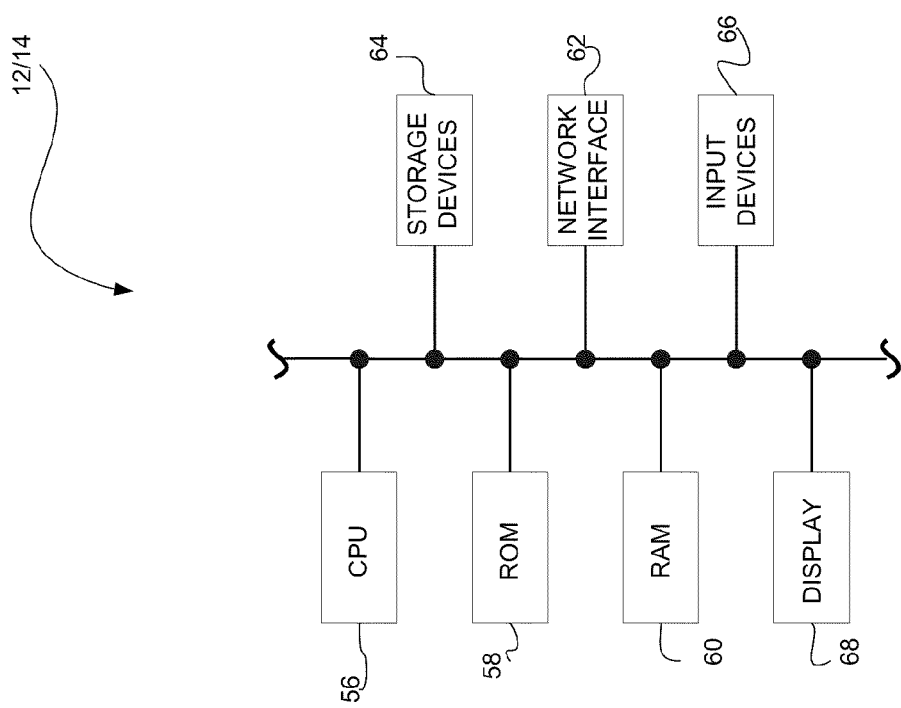
FIG. 2 illustrates the functional elements of an example information processor, user workstation/host, and/or control server.

FIG. 2 illustrates the functional elements of an example information processor 12, user workstation/host 14, and/or control server 18, and that include one or more central processing units (CPU) 56 used to execute software code and control the operation of information processor 12. Other elements include read-only memory (ROM) 58, random access memory (RAM) 60, one or more network interfaces 62 to transmit and receive data to and from other computing devices across a communication network, storage devices 64 such as a hard disk drive, floppy disk drive, tape drive, CD ROM or DVD for storing program code databases and application data, one or more input devices 66 such as a keyboard, mouse, track ball, microphone and the like, and a display 68.

The various components of devices 12, 14 and 18 need not be physically contained within the same chassis or even located in a single location. For example, storage device 64 may be located at a site which is remote from the remaining elements of information processor 12, and may even be connected to CPU 56 across communication network 16 via network interface 62. Information processor 12 preferably includes a memory equipped with sufficient storage to provide the necessary databases, forums, and other community services as well as acting as a web server for communicating hypertext markup language (HTML), Java applets, Active-X control programs or the like to user workstation/hosts 14. Information processors 12 are arranged with components, for example, those shown in FIG. 2, suitable for the expected operating environment of information processor 12. The CPU(s) 56, network interface(s) 62 and memory and storage devices are selected to ensure that capacities are arranged to accommodate expected demand.

The functional elements of devices 12, 14 and 18 shown in FIG. 2 are of the same categories of functional elements present in each of the devices. However, not all elements need be present in each respective user workstation/host device. For example, storage devices, in the case of PDA's, and the capacities of the various elements are arranged to accommodate the expected user demand. For example, CPU 56 in user workstation/host 14 may be a smaller capacity CPU than the CPU present in the information processor 12. Similarly, it is likely that information processor 12 will include storage devices of a much higher capacity than storage devices present in user workstation/host device 14. Of course, one of ordinary skill in the art will understand that the capabilities of the functional elements can be adjusted as needed.

The nature of the invention is such that one skilled in the art of writing computer executable code (i.e., software) can implement the functions described herein using one or more of a combination of popular computer programming languages and developing environments including, but not limited to, C, C++, Visual Basic, JAVA, HTML, XML, ACTIVE SERVER PAGES, JAVA server pages, servlets, MYSQL, PHP and a plurality of web site development applications.

Although the systems and methods are described by way of example herein and in terms of a web-based system using web browsers and a web site server (e.g., information processor 12), system 10 is not limited to such a configuration. It is contemplated that system 10 is arranged such that user workstation/host 14 communicates with and displays data received from information processor 12 and/or control server 18 using any known communication and display method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on information processor 12, user workstation/host 14 and/or control server 18, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, WINDOWS 7, MAC OS, UNIX, LINUX, PALM OS, and any other suitable operating system.

As used herein, references to displaying data on information processor 12, user workstation/host device 14 and/or control server 18 regard the process of communicating data across communication network 16 and processing the data such that the data is viewed on a display 68, for example, by using a web browser and the like. As is known with web browsing software, the display 68 on user workstation/host 14 presents sites within the system 10 such that a user can proceed from site to site within the system by selecting a desired link.

As used herein, the term "module" refers generally to one or more discrete components that contribute to the effectiveness of the present application. Modules can operate or, alternatively, depend upon one or more other modules in order to function.

Figure 3:
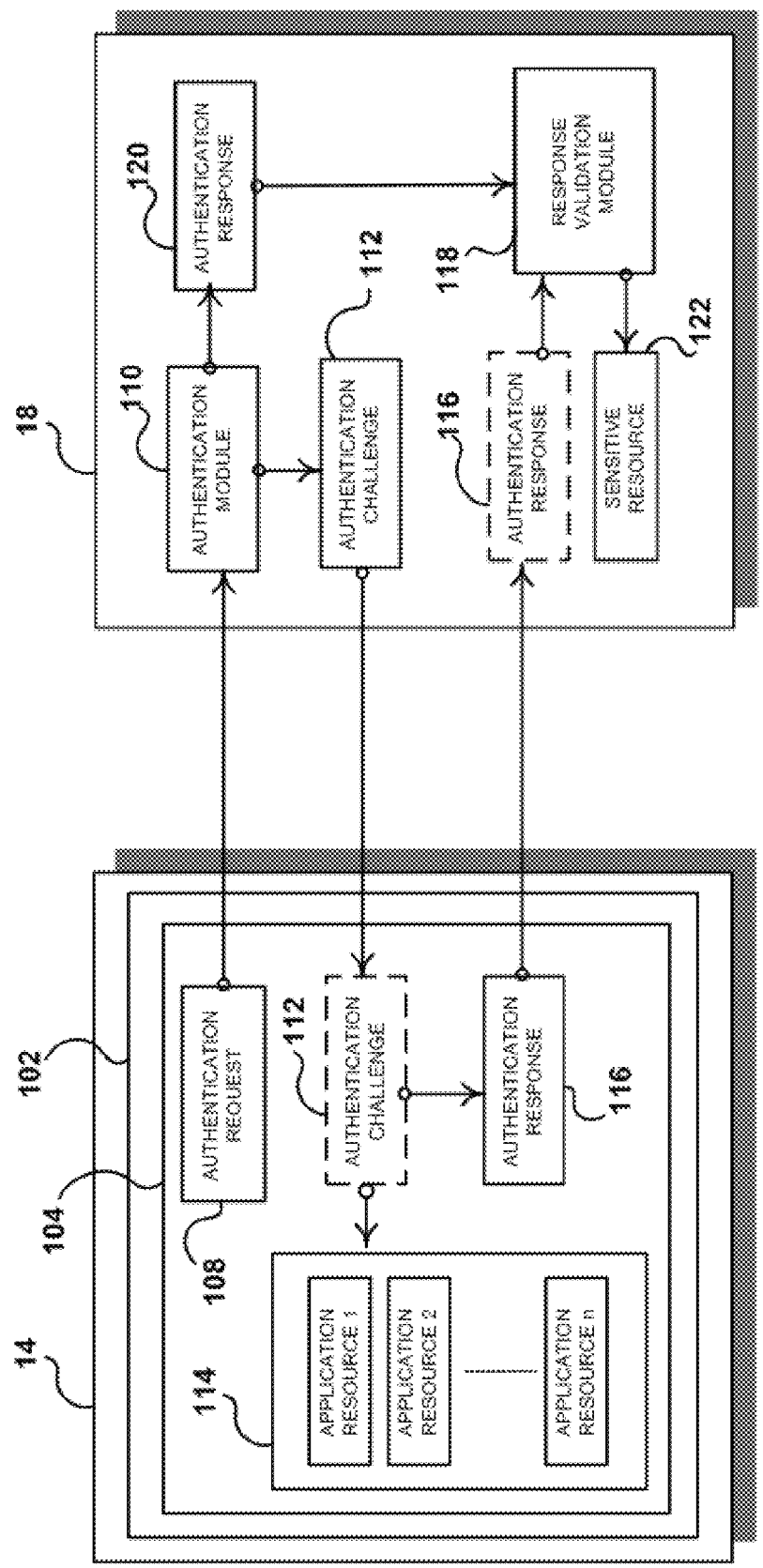
FIG. 3 is a block diagram that portrays an example embodiment of method and service for authenticating a software application.

FIG. 3 is a block diagram that portrays an example environment of method and service for authenticating a software application from a host device 14 to a control sever 18, according to an embodiment of the present application. As shown in FIG. 3, the user workstation/host device 14 includes software application 102, which may include software program code or a computer program product that is embedded within, or installed on, the user workstation/host device 14. The software application is executed within a respective application context 104 that includes resources and objects that may be optional or otherwise required for proper execution of software application 102 on user workstation/host device 14.

Continuing with reference to FIG. 3, when software application 102 requires access to a sensitive resource 122 on control server 18, software application 102 sends an authentication request 108 to server authentication module 110 of control server 18. Based on the authentication request 108, server authentication module 110 generates an authentication challenge 112 and an expected server authentication response 120. Authentication challenge 112 is transmitted from control server 18 to software application 102 operating on user workstation/host device 14, and expected server authentication response is retained for comparison with an actual server authentication response to be received from user workstation/host device 14.

Authentication challenge 112 may be sent in the form of executable code. For example, the challenge 112 may be formatted as encoded program instructions that are loaded within or part of application context 104 and readily executed. During execution of authentication challenge 112, one or more application resources 114 may be accessed or operated to generate an authentication response 116 which, when generated, is transmitted to control sever 18 for validation.

Control server 18 further includes response validation module 118, which receives authentication response 116 from user workstation/host device 14. Control server 18 compares authentication response 116 with server authentication response 120. The server authentication response 120 can be previously stored on the control server or is generated internally by the control server by running the same authentication challenge on a reference integral application, for example, in a secure sand-boxed virtual machine environment (as known in the art) and replicating the application context existing on the host device. If authentication response 116 differs from server authentication response 120, control server 18 preferably denies access to one or more sensitive resource 122 to software application 102. Alternatively, if authentication response 116 and server authentication response 120 are equal, control server 18 grants software application 102 access to the sensitive resource 122.

Figure 4A:
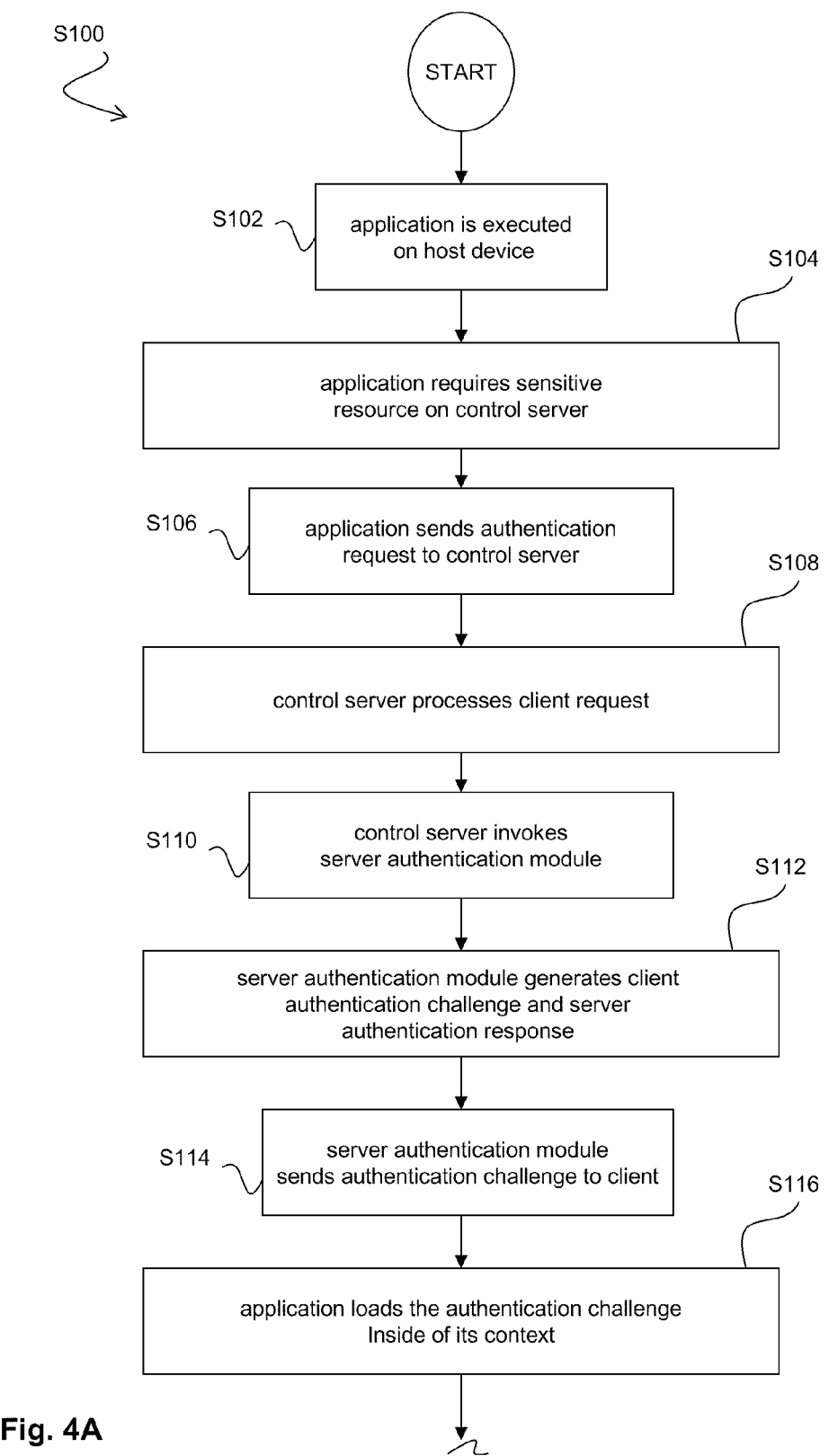
FIGS. 4A and 4B are flowcharts illustrating example steps associated with authenticating a software application from a host device to a control sever.
Figure 4B:
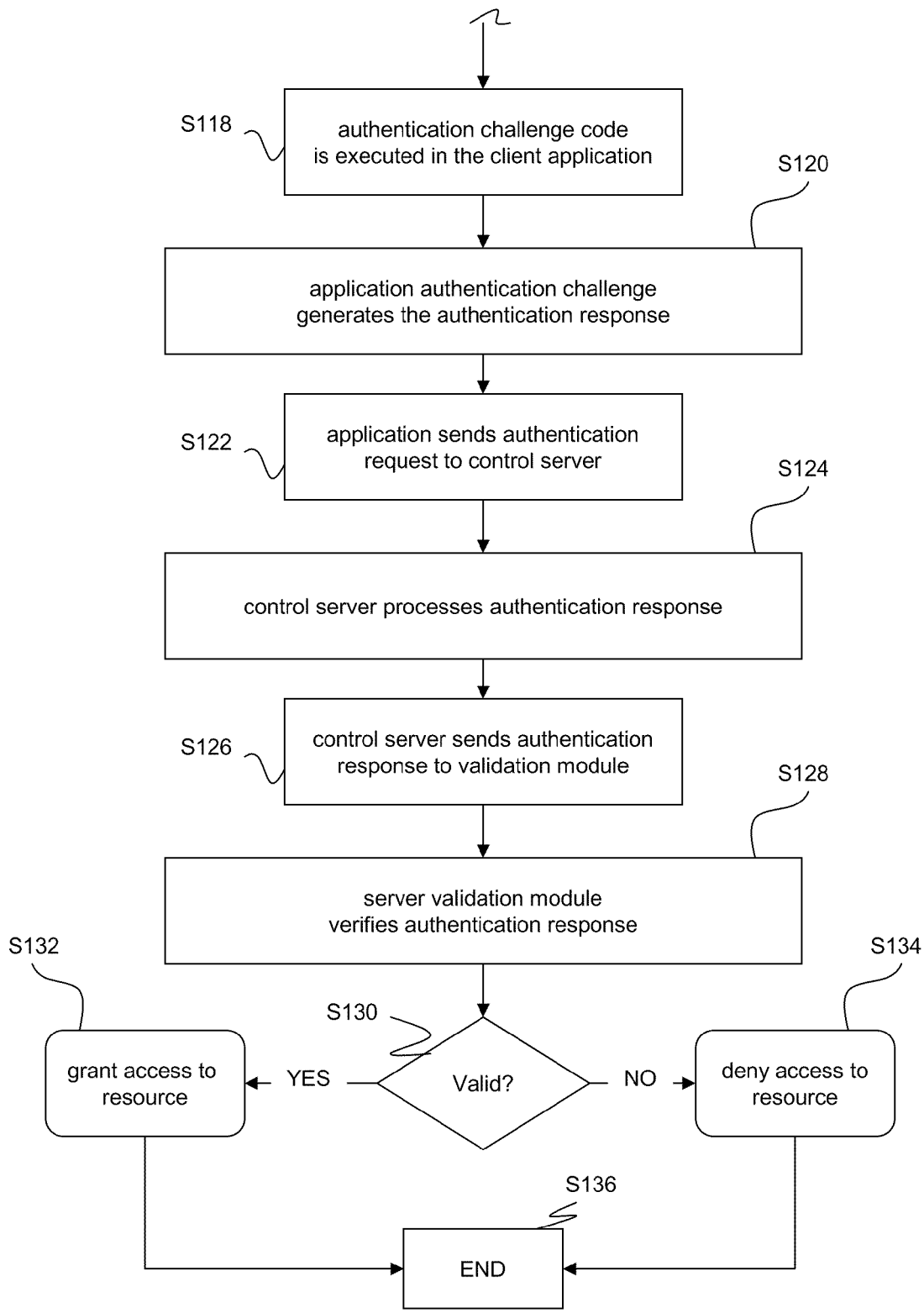

FIGS. 4A and 4B are flowcharts illustrating example steps S100 associated with authenticating a software application from a host device 14 to a control sever 18, in accordance with an embodiment. At step S102, software application 102 is executed on user workstation/host devices 14. During execution of the application, one or more sensitive resources are required that are stored or otherwise provided on control server 18 (step S104). Accordingly, software application 102 sends an authentication request 108 to control server 18 (step S106). Control server 18 receives authentication request 108 and, in step S108, processes request 108. To process request 108, control server 18 invokes the server authentication module (step S110). By processing request 108, server authentication module 110 generates an authentication challenge 112 and an expected authentication response (step S112). Thereafter, the challenge 112 is transmitted by authentication module 110 to user workstation/host device 14 executing software application 102 (step S114).

Continuing with the example steps 100 shown in FIGS. 4A and 4B, after challenge 112 is received, software application 102 loads authentication challenge within the operating context of application 102 (step S116), and the authentication challenge program code is executed application 102 (step S118) (FIG. 4B). In response, authentication challenge 112 generates a respective authentication response 116 (step S120). Thereafter, response 116 is transmitted to control sever 18 (step S122). Thereafter response 116 is received by control server 18, control server 18 processes the authentication response 116 (step S124). For example, by comparing the authentication response 116 with the expected authentication response generated in step S110. The processing occurs via validation module 118 (step 126), and server validation module 118 verifies the authentication response 116 (step S128). Thereafter, a determination is made in step S130 whether authentication response 116 is valid or not. If so, then in step S132, control server 18 grants access to the sensitive resource to application 102. If not, then in step S134, application 102 is denied access to the sensitive resource. Thereafter, the process ends (step S136).

Thus and in accordance with the example steps illustrated in the flowcharts of FIGS. 4A and 4B, an effective and new form of authentication is provided to preclude or otherwise allow access to sensitive information, data and/or Internet web services or resources to an application executing on a host device.

Although the various embodiment and examples of the present application described herein represent one or a few operating contexts, numerous modifications and alternatives are supported for authenticating an application without departing from the teachings herein. For example, though many of the examples and descriptions provided herein relate to authenticating client software applications, the application is not so limited. The present application is applicable, for example, for any executable software code, such as server applications as well as applications running from a mobile device or from a tamper-proof device.

FIG. 5 is a block diagram that illustrates an alternative embodiment. In the example shown in FIG. 5, an authentication module 202 is provided on or with an external tamper-proof device 200 (previously illustrated as device 17, FIG. 1). Device 200 may be connected to user workstation/host device 14, and may further contain a sensitive resource 210 (e.g. a user private key). In the embodiment shown in FIG. 5, device 200 receives an authentication request 108 from software application 102, and transmits to software application 102 a randomly selected authentication challenge identifier ID and run parameters 206.

More particularly, the information provided in authentication challenge identifier ID and run parameters 206 are used to execute an authentication challenge on user workstation/host device 14 with a corresponding identifier (ID) that is arbitrarily selected among a number of other authentication challenges 124, which were previously generated and stored within application 102 and/or on user workstation/host device 14. Identifier (ID) and run parameters 206, in addition to internal application resources 114, preferably generate a unique and correct authentication response 126, which will be compared to a corresponding response 204 previously stored on external device 200 by the response validation module 208. If the two responses are equal, external device 200 grants client application 102 with access to the sensitive resource 210.

As discussed above, the robustness of prior art software tamper-detection techniques suffers because the detection mechanism relies on a comparison or check between a calculated value and an expected value. This is considered a weak form of tamper-detection since it is often easy for an attacker to remove the check or to find and store all expected return values. In the present method and service, the calculated return values are obtained dynamically by executing the authentication challenge either received from the control server or dictated by the identifier (ID) and parameters obtained from an external tamper-proof device, thus eliminating an important vulnerability of prior art.

Figure 6:
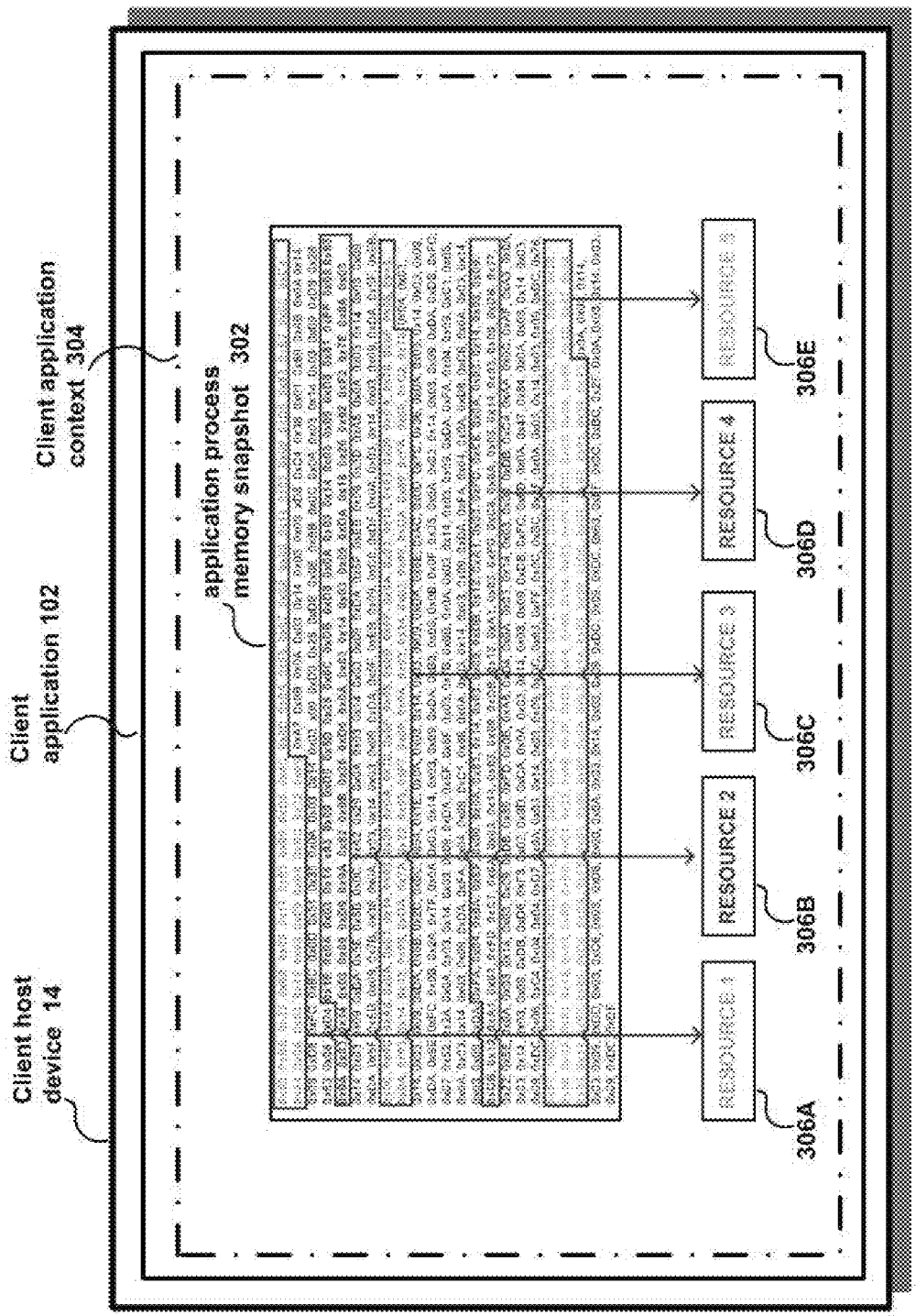
FIG. 6 illustrates an image snapshot of an application process that executes on user workstation/host device.

FIG. 6 illustrates an image, referred to herein as a "snapshot," of an application process 302 that executes on user workstation/host device 102. Snapshot 302 of the application process represents a respective context 304 within the software application. As noted above, authentication challenge 112 is transmitted to user workstation/host device 14, and is executed in context 304 e.g., within the application's resources and objects for the software's execution. Further and as illustrated in FIG. 6, application 102 includes several application resources 306A-306E. Information about the respective application resources 306 is preferably stored and referenced by response validation module 118 (FIG. 3) during an authentication process. Response validation module 118 uses the image snapshot 302 to determine whether application 102 has been altered or otherwise tampered with.

Thus, in an embodiment and as illustrated in FIG. 6, application resources 306 may be determined or otherwise selected to include elements of the software application's resources and memory objects which may be necessary for correct or proper execution of at least part or some of the software application. In other words, the software application can be considered to be integral for the purpose of providing access to the information, data and/or services only if the application resources 306 have not been tampered with or altered.

Although the present application has been described in relation to particular embodiments thereof, many other variations and modifications and other uses will become apparent to those skilled in the art. It is preferred, therefore, that the present application be limited not by the specific disclosure herein.

What is claimed is:

1. A method for validating executable program code operating on at least one computing device, the method comprising:
executing first program instructions on a first computing device, wherein the first program instructions include a request for access to at least one sensitive resource pertaining to a second computing device;
transmitting from the first computing device to the second computing device an authentication request for access to the at least one sensitive resource pertaining to the second computing device;
generating, in real-time, by the second computing device, in response to the authentication request required for access to the at least one sensitive resource and received from the first computing device, an authentication challenge comprising a non-predetermined set of instructions performing an operation in response to the authentication request;
executing, by the second computing device, the authentication challenge, and generating an expected authentication response of the second computing device from said execution by the second computing device;
transmitting the authentication challenge from the second computing device to the first computing device;
executing, by the first computing device, the authentication challenge, and generating a pre-validated authentication response from said execution by the first computing device;
receiving from the first computing device by the second computing device the pre-validated authentication challenge;
performing validation by determining whether the pre-validated authentication response is a validated authentication response by comparing the pre-validated authentication response to the expected authentication response; and
granting the first computing device access to the at least one sensitive resource pertaining to the second computing device if the pre-validated authentication response is determined to be a validated authentication response.

2. The method of claim 1, wherein the determination of a validated authentication response indicates that at least a portion of the first program instructions on the first computing device have not been impermissibly altered.

3. The method of claim 2, wherein any one of: (i) the authentication request includes an application identifier provided by the first program instructions, and (ii) any one of: (a) the expected authentication challenge and (b) the pre-validated authentication challenge, is particular to the respective application identifier thereof.

4. The method of claim 1, wherein the performing of validation represents an outcome of a comparison between the at least a portion of the first program instructions and a previously stored representation of the at least a portion of the first program instructions.

5. The method of claim 1, further comprising any one of:
transmitting to the second computing device, from the first computing device, a second authentication request for access to any one of said at least one sensitive resource or another sensitive resource pertaining to any one of said second computing device or another computing device; and
transmitting from the first computing device to the second computing device a second pre-validated authentication challenge differing from said pre-validated authentication challenge and being generated in response to the second authentication request.

6. The method of claim 1, wherein any one of (i) the authentication challenge being executed by the first computing device; and (ii) the second computing device being generated at least partially randomly.

7. The method of claim 1, further comprising:
receiving from the second computing device a request for at least one user authentication credential prior to receiving said pre-validated authentication response at said second computing device.

8. The method of claim 1, wherein the authentication challenge is generated as a function of previously generated application authentication challenges.

9. The method of claim 8, wherein the at least one sensitive resource comprises any one of a memory object, an information access, a data access, an Internet web service, a resident resource and a non-resident resource.

10. The method of claim 1, wherein the first program instructions are resident in an operating system of the first computing device.

11. A method for validating executable program code operating on a first computing device, the method comprising:
executing first program instructions, wherein the first program instructions include a request for access to at least one sensitive resource pertaining to a second computing device;
transmitting to the second computing device an authentication request for access to the at least one sensitive resource pertaining to the second computing device;
wherein the second computing device: (i) generates, in real-time, in response to the authentication request required for access to the at least one sensitive resource and received from the first computing device, an authentication challenge comprising a non-predetermined set of instructions performing an operation in response to the authentication request; and (ii) executes the authentication challenge, and generates an expected authentication response of the second computing device from said execution;
receiving the authentication challenge from to the second computing device;
executing the authentication challenge and generating a pre-validated authentication response from said execution;
transmitting to the second computing device the pre-validated authentication challenge; and
wherein the second computing device: (i) performs validation by determining whether the pre-validated authentication response is a validated authentication response by comparing the pre-validated authentication response to the expected authentication response; and (ii) grants the first computing device access to the at least one sensitive resource pertaining to the second computing device if the pre-validated authentication response is determined to be a validated authentication response.

12. The method of claim 11, wherein the determination of a validated authentication response indicates that at least a portion of the first program instructions have not been impermissibly altered.

13. The method of claim 12, wherein any one of: (i) the authentication request includes an application identifier provided by the first program instructions, and (ii) any one of: (a) the expected authentication challenge and (b) the pre-validated authentication challenge, is particular to the respective application identifier thereof.

14. The method of claim 11, wherein the performing of validation represents an outcome of a comparison between the at least a portion of the first program instructions and a previously stored representation of the at least a portion of the first program instructions.

15. The method of claim 11, further comprising:
transmitting to the second computing device a second authentication request for access to any one of said at least one sensitive resource or another sensitive resource pertaining to any one of said second computing device or another computing device; and
transmitting to the second computing device a second pre-validated authentication challenge differing from said pre-validated authentication challenge and being generated in response to the second authentication request.

16. The method of claim 11, wherein any one of (i) the authentication challenge being executed by the first computing device; and (ii) the second computing device being generated at least partially randomly.

17. The method of claim 11, further comprising:
transmitting to the second computing device a request for at least one user authentication credential prior to transmitting said pre-validating authentication response to said second computing device.

18. The method of claim 11, wherein the authentication challenge is generated as a function of previously generated application authentication challenges.

19. The method of claim 18, wherein the at least one sensitive resource comprises any one of a memory object, an information access, a data access, an Internet web service, a resident resource and a non-resident resource.

20. The method of claim 11, wherein the first program instructions are resident in an operating system of the first computing device.

21. A method for validating by a second computing device executable program code operating on a first computing device, the method of the second computing device comprising:
wherein in response to first program instructions executing on a first computing device, wherein the first program instructions include a request for access to at least one sensitive resource pertaining to the second computing device, receiving from the first computing device an authentication request for access to the at least one sensitive resource pertaining to the second computing device;
generating, in real-time, in response to the authentication request required for access to the at least one sensitive resource and received from the first computing device, an authentication challenge comprising a non-predetermined set of instructions performing an operation in response to the authentication request;
executing the authentication challenge, and generating an expected authentication response from said execution;
transmitting the authentication challenge to the first computing device;
wherein, by the first computing device, the authentication challenge is executed, and a pre-validated authentication response is generated from said execution;
receiving from the first computing device the pre-validated authentication challenge;
performing validation by determining whether the pre-validated authentication response is a validated authentication response by comparing the pre-validated authentication response to the expected authentication response; and
granting the first computing device access to the at least one sensitive resource if the pre-validated authentication response is determined to be a validated authentication response.

22. The method of claim 21, wherein at least one identifier and parameter of the authentication request are selected randomly to provide the authentication challenge.

23. The method of claim 21, wherein any authentication request and any authentication challenges is updated on the first computing device by periodically connecting to the second computing device.

24. A system for validating executable program code operating on at least one computing device, the system comprising:
a first computing device; and
a second computing device,
and further comprising:
executing first program instructions on the first computing device, wherein the first program instructions include a request for access to at least one sensitive resource pertaining to a second computing device;
transmitting from the first computing device to the second computing device an authentication request for access to the at least one sensitive resource pertaining to the second computing device;
generating, in real-time, by the second computing device, in response to the authentication request required for access to the at least one sensitive resource and received from the first computing device, an authentication challenge comprising a non-predetermined set of instructions performing an operation in response to the authentication request;
executing, by the second computing device, the authentication challenge, and generating an expected authentication response of the second computing device from said execution by the second computing device;
transmitting the authentication challenge from the second computing device to the first computing device;
executing, by the first computing device, the authentication challenge, and generating a pre-validated authentication response from said execution by the first computing device;
receiving from the first computing device by the second computing device the pre-validated authentication challenge;
performing validation by determining whether the pre-validated authentication response is a validated authentication response by comparing the pre-validated authentication response to the expected authentication response; and
granting the first computing device access to the at least one sensitive resource pertaining to the second computing device if the pre-validated authentication response is determined to be a validated authentication response.

* * * * *